United States Patent [19]

Ohta et al.

[11] 4,159,493

[45] Jun. 26, 1979

[54] COMBINED MAGNETIC HEAD HAVING RECORDING AND PLAYBACK CORES

[75] Inventors: Hajime Ohta, Hamamatsu; Kenji Muto, Yokohama, both of Japan

[73] Assignee: Nippon Gakki Seizo Kabushiki Kaisha, Hamamatsu, Japan

[21] Appl. No.: 814,713

[22] Filed: Jul. 11, 1977

[30] Foreign Application Priority Data

Jul. 14, 1976 [JP] Japan ................................ 51-83772

[51] Int. Cl.$^2$ ................................................ G11B 5/27

[52] U.S. Cl. .................................... 360/121; 360/125

[58] Field of Search ............... 360/121, 122, 125, 106, 360/105, 92, 129, 119, 118, 129

[56] References Cited

U.S. PATENT DOCUMENTS

| | | | |
|---|---|---|---|
| 3,167,618 | 1/1965 | Oster et al. | 360/119 |
| 3,242,556 | 3/1966 | Broughton | 29/603 |
| 3,358,276 | 12/1967 | Schulte | 360/118 |
| 3,440,359 | 4/1969 | Page et al. | 360/106 |
| 3,564,153 | 2/1971 | Kronfeld | 360/121 |
| 3,668,669 | 6/1972 | Marino et al. | 360/121 |
| 3,824,622 | 7/1974 | Kashimoto | 360/121 |
| 3,829,895 | 8/1974 | Tanaka et al. | 360/121 |
| 3,969,770 | 7/1976 | Cavallari | 360/121 |
| 3,978,523 | 8/1976 | Tanaka et al. | 360/122 |
| 3,983,579 | 9/1976 | Nishinakagawa | 360/106 |

*Primary Examiner*—Alfred H. Eddleman
*Attorney, Agent, or Firm*—Cushman, Darby & Cushman

[57] ABSTRACT

A single magnetic head assembly having vertically stacked separate units of recording and playback cores is comprised of a first unit of at least one recording cores, and a second unit of at least one playback core which is located in stacked positional relationship relative to the first unit. These units of cores are arranged to be jointly shifted vertically to meet the required track of the magnetic tape when used, to thereby utilize that particular unit of cores optimum for recording or playback, as desired.

12 Claims, 12 Drawing Figures

COMBINED MAGNETIC HEAD HAVING RECORDING AND PLAYBACK CORES

BACKGROUND OF THE INVENTION (a) Field of the Invention

The present invention relates to a magnetic head capable of performing both recording and playback, and more particularly it pertains to a magnetic head assembly having vertically stacked separate units of recording and playback cores combined in a single head.

(b) Description of the Prior Art

As the arrangement of magnetic heads of a tape recorder, a three-head system comprising an erasing head, recording head and a playback head, which are independent of each other, is known. In such three-head system, each magnetic head is designed to behave under the optimum condition required for fulfilling its function.

The respective optimum conditions for the functions of recording head and playback head will be described hereunder. As the recording magnetic head, it is desirable generally that its core has a relatively wide gap at the front ends of the core which contact a running magnetic tape, and that it has such magnetic characteristics represented by a great density of its maximum magnetic flux and also by a low impedance. As the playback magnetic head, it is desirable generally that its core has a relatively narrow gap at the front ends of core and that it has a high impedance.

A further detailed description of these magnetic heads will be made by referring to FIGS. 1 and 2. FIG. 1 shows a frequency-playback output characteristic of a playback magnetic head, on the basis of the width of gap of the core serving as the parameter. FIG. 2 shows a gap width-recording efficiency characteristic of the core gap of the recording magnetic head. In FIG. 1, the arrow indicates the direction in which the core gap which serves as the parameter becomes narrower. The width of the gap is shown to become wider in the order of the symbols a, b and c. For the convenience of understanding, the properties which are required of a recording magnetic head may be summarized as follows:

(1) good recording efficiency;
(2) good linearity of input and output characteristic;
(3) large dynamic range; and
(4) small distortion.

Accordingly, a recording magnetic head whose core has an appropriately broad gap width as shown in FIG. 2 will provide the aforesaid properties.

The properties required of a playback magnetic head, on the other hand, may be summarised as follows:

(1) good frequency characteristic (minimized loss in high frequency range); and
(2) good S/N ratio (high level of reproducing output).

Accordingly, as will be understood from FIG. 1, a playback magnetic head assembly having a narrower core gap is capable of satisfying the above-mentioned requirements.

As discussed above, it should be understood that, in a three-head system tape recorder, it is possible to design the respective magnetic heads so as to have their own optimum functions to satisfy their own assignments. This may be possible with an open-reel type recording and playback apparatus. However, would this be also possible with a tape recorder using a magnetic tape housed in a cassette?

A so-called cassette half is manufactured in strict conformity with a predetermined specifications allowing only small openings for receiving magnetic heads. For this reason, difficulty has been well recognized in attempting to make a three-head system for a cassette type tape recorder. As a result, it has been the usual practice to use a two-head system in a tape recorder, which comprises an erasing magnetic head and another magnetic head which concurrently has both the recording function and playback function.

Nevertheless, there is provided a three-head system cassette tape recorder which is arranged so that a third magnetic head assigned for playback or for recording is inserted in a small window other than those windows of a cassette half which are intended for the insertion of a recording magnetic head and playback magnetic head. However, from the structural point of view, this third magnetic head inevitably is required to be small, compact in size. Thus, according to the prior technique, there has not been obtained a fully satisfactory functional characteristic from such abnormally small-sized magnetic head as compared with a normal-sized such head. Furthermore, a magnetic head which is capable of satisfying the above-mentioned requirements of functions naturally has too complicated arrangement to be formed into such small size. Therefore, it has been extremely difficult to manufacture such a small-sized magnetic head having a satisfactory function. Furthermore, such a magnetic head gives rise to a problem in term of mechanical strength. What is more, the production of such magnetic head will unavoidably become expensive. For these reasons, the three-head system for cassette tape recorder has not reached the state of becoming popular. In addition, it is needless to say that a three-head system is more expensive as compared with the two-head system.

As one of recent models of the so-called three-head recording and playback combination systems, there is the arrangement that the recording magnetic head and the playback magnetic head are designed to exert their functions independently of each other and that these two magnetic heads are combined in horizontally adjacent relationship in the direction of the travel of the magnetic tape and also that the cores in the respective magnetic heads are aligned on the same horizontal lines. Such known horizontally arranged three-head system has the following inconveniences.

(a) It is difficult to insure the contact of a running magnetic tape onto the spaced core gaps under the same conditions, and accordingly the touch of the magnetic tape becomes unstable;

(b) The respective core gaps of the horizontally combined recording and playback magnetic head which may be called a double-gap type are desirably in contact, through a magnetic tape, with the urging pad whose size is standardized and which is housed within the cassette. Such arrangement inevitably calls for a drastic reduction in size of each of these two combined magnetic heads. This reduction in size, in turn, will lead to the previously mentioned deterioration of function and also to the difficulty in the manufacture of such a small-sized combination head; and (c) The total area of contact between the magnetic tape and the contact surface of the magnetic head increases, resulting in an increase in the running resistance of the magnetic tape, i.e., an increase in the load of a tape pinch-roller and like member.

SUMMARY OF THE INVENTION

It is, therefore, a primary object of the present invention to provide a combined magnetic head assembly having vertically stacked separate units of recording and playback cores, which is free from the inconveniences of the known two-head system and three-head system for cassette tape recorders.

Another object of the present invention is to provide the magnetic head assembly of the type described above, which actually is a two-head system if the separate erasing magnetic head is taken into account, but which sufficiently is capable of concurrently exerting the functions of the known three-head system.

In order to attain these objects, the magnetic head according to the present invention has the arrangement that the recording core unit and the playback core unit are arranged in a vertically stacked fashion, as a single magnetic head, so that recording is performed by that core gap which is optimum for the recording mode, and that playback is carried out by the specific playback core gap which is optimum for the playback mode.

DETAILED DESCRIPTION OF THE PREFERRED EMBODIMENTS

According to the present invention, there is provided a magnetic head assembly which is arranged so that at least one recording core unit and at least one playback core unit are disposed in vertically stacked relationship in a single magnetic head casing and that either one of said core units is caused to be positioned to abut the required track of the magnetic tape mounted on a tape recorder by vertically shifting the position of the magnetic head in accordance with the selected mode of operation between recording and playback.

Hereunder will be given a detailed description of some of the preferred examples embodying the present invention.

Figure 1:
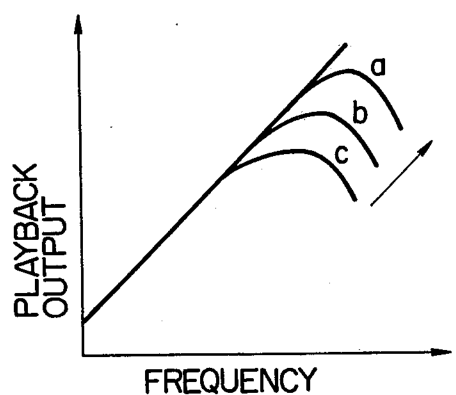
FIG. 1 is a chart for explaining a general frequency versus playback output characteristic of a playback magnetic head.
Figure 2:
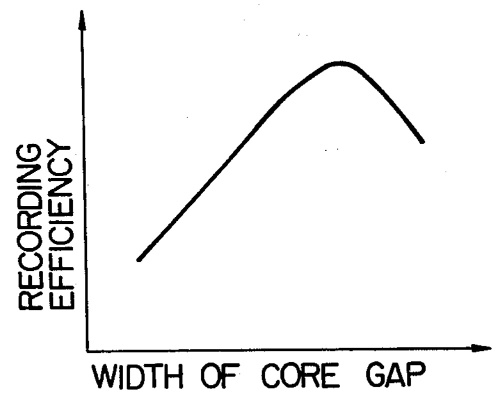
FIG. 2 is a chart for explaining a general core gap width versus recording efficiency characteristic of a recording magnetic head.
Figure 3:
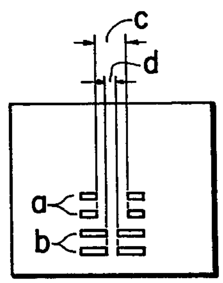
FIG. 3 is a diagrammatic explanatory representation of front side of the magnetic head according to the present invention which is suitable for usual arrangement of recording tracks used in cassette tape recorder.

Referring to FIG. 3, there is shown, in a diagrammatic representation, a basic arrangement of the core units in a single magnetic head intended for a 4 track—2 channel type cassette tape recorder. Letter a represents a recording core having a relatively broad gap width c of a good recording characteristic; letter b represents a playback core having a relatively narrow gap width d of a good playback characteristic. In this example, the respective recording core unit and playback core unit are arranged in vertically stacked relationship in such a way that the mid points of the respective core gaps are aligned on the same single vertical line and also that either of the recording core unit and the playback core unit is selected to be positioned to face the required tracks of the magnetic tape in operation. More specifically, the gap of each of the pair of recording cores is set to be about 4 μm, whereas the gap of each of the pair of playback cores is set to be about 1–2 μm.

In this magnetic head, two playback cores b and b having the same characteristic are disposed in vertically stacked relationship forming a pair, and two recording cores a and a having the same characteristic are disposed in vertically stacked relationship forming a pair. These two pairs of cores are arranged so as to be in vertically stacked relationship relative to each other. The two pairs of cores are arranged in a substantially central portion of the magnetic head closer to the bottom end thereof to leave a blank portion in the region closer to the upper end of the magnetic head. In this example, the second unit of playback cores is arranged so as to abut required tracks of the magnetic tape when this magnetic head is inserted in the window of the cassette intended for the insertion of recording and playback head or heads, while the first unit of recording cores is arranged so as to abut the other tracks of the magnetic tape above the mentioned required tracks.

In such an instance, the required vertical overall width of the contact surface of the magnetic head need to have a sufficient length for supporting the remaining area of the magnetic tape when this magnetic head is shifted vertically so that its activated core unit is brought into contact with required tracks of the tape. This length is assured particularly by the provision of the blank portion in the upper region of the magnetic head.

As is well known, there is a cassette tape of one type which is worldly standardized in dimension as follows. The overall width of the magnetic tape is designated as 3.81 mm. The width of the recording track provided on the one half (about 1.9 mm in width) of the magnetic tape is usually 1.5 mm. Accordingly, the paired cores of the magnetic head for a 4 track—2 channel cassette tape recorder require to fall in a dimension range not exceeding said width of 1.5 mm of the recording track. In the magnetic head of this embodiment, a first unit of paired recording cores has an overall width less than 1.5 mm. Also, a second unit of paired playback cores which are positioned above said first unit has an overall width less than 1.5 mm.

Figure 4:
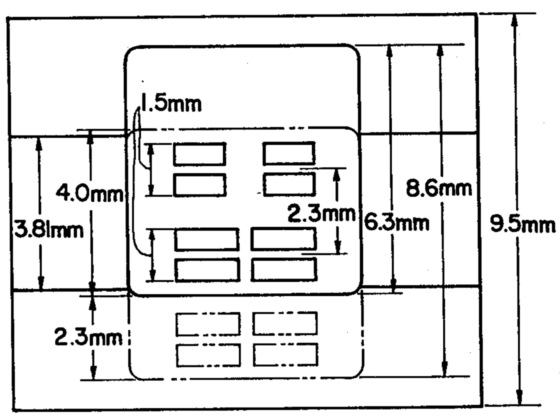
FIG. 4 is an explanatory diagrammatic front view of a more concrete representation of the magnetic head shown in FIG. 3.

Let us now refer to FIG. 4 which shows a more concrete representation of FIG. 3. In this figure, the magnetic head is shown in its state of being shifted upwardly to be in the playback mode. In this state, the two pairs of cores are in contact with the tracks on both half sides of the magnetic tape. In this figure, the required vertical overall width of the magnetic head consists of a distance which is a little more than overall width of the magnetic tape plus a distance of the aforesaid remaining area of the magnetic tape when the magnetic head is shifted downwardly, i.e., about 4.0 mm+2.3 mm=6.3 mm in this example. In order that the first core unit a and a moves to the position of the second core unit b and b or vice versa, the magnetic head has to cover the distance of about 2.3 mm which is the vertical stroke of the magnetic head.

Therefore, the sum of the overall width of about 6.3 mm of the magnetic head and its distance of stroke of about 2.3 mm will make about 8.6 mm in total. On the other hand, the standard vertical width of the window of the cassette half is about 9.5 mm. Thus, it will be understood that the magnetic head is able to move upwardly and downwardly to bring one of the core units into operative contact with required ones of the tracks of the magnetic tape without being interfered by either one of the upper wall and the bottom wall of the window.

The respective recording and playback core units themselves of the magnetic head of the present invention may be comprised of known cores, each core being positioned vertically one above another with the intervention therebetween of a shielding plate. Such assembly of cores are housed in a casing to provide a magnetic head assembly for use in the present invention.

Figure 5:
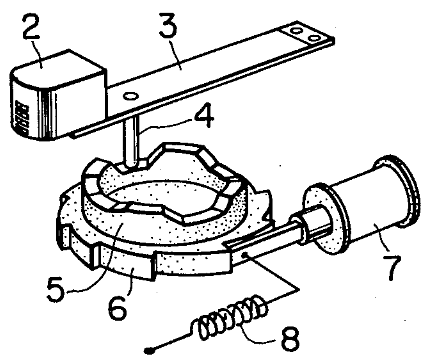
FIG. 5 is a diagrammatic perspective view of an example of position shifting means for magnetic head.

In use, this head assembly is moved either upwardly or downwardly in accordance with the required tracks of the magnetic tape for either the recording mode or the playback mode. Thus, a specific core (cores) which is (are) of the optimum condition for either the recording mode or the playback mode can be used. Here, description will be made briefly about means of shifting the position of the head assembly vertically. It should be understood that this position shifting means may be of any known type. FIG. 5 shows an example of such position shifting means.

This position shifting means comprises a leaf spring 3, an actuating rod 4, a shifter cam 5, a ratchet wheel 6, a solenoid 7 and a coil spring 8. The leaf spring 3 is fixed at its one end to a frame (not shown) of the cassette tape recorder, and is provided at its other end with the magnetic head 2 of the present invention. This magnetic head 2 may be so located as to be adjustable in the tape-and-head alignment in a known manner. The shifter cam 5 in this example is comprised of a hollow cylindrical cam having a plurality of stepped portions formed on its circumferential edge to serve as the cam surface. The depth of the respective stepped portions is identical. The cam surface in this example is such that each of the stepped portions has a gently inclined edge portion. The actuating rod 4 extends from one side of the leaf spring 3 and its free end is always in slidable contact with the cam surface. This shifter cam 5 is coaxially provided, on that side opposite to the cam surface, with a ratchet wheel 6 having circumferential indentations each corresponding positionally to the respective bottoms and ridges of the cam surface. The solenoid 7 is provided in association with this ratchet wheel 6 in such a way that the forward end of a plunger of this solenoid may be brought into slidable contact with any one of the indentations of the ratchet wheel 6, whereby to provide, in combination, a ratchet construction. The coil spring 8 has one end fixed to the frame of the cassette tape recorder and has another end secured to the forward end of the plunger for quick restoration of the normal position of the plunger.

Next, the behavior of the means for shifting the position of the magnetic head will be described. In FIG. 5, the actuating rod 4 is shown to be in contact with the bottom of the stepped portion of the cam surface. Accordingly, the magnetic head 2 associated with this position shifting means is at its lower position, i.e., it is in its recording mode. When the recording mode is switched over to the playback mode, the solenoid 7 is actuated and accordingly its plunger retreats along the circumferential edge of the ratchet wheel 6 up to the next indentation. By the subsequent restoring action of the coil spring 8, the forward end of the plunger pushes this fresh indentation forwardly. As a result, the associated shifter cam is caused to rotate by a predetermined angle corresponding to the distance from the bottom of the ridge of the stepped portion. Thus, the actuating rod 4 is caused to climb from the bottom up to the top of the ridge of the cam surface. This operation of the actuating rod 4 causes the magnetic head 2 to move upwardly to its upper position which is assigned for the playback mode. The position-shifting behavior of the magnetic head 2 as stated above will be repeated at each time of change in the mode of operation of the cassette tape recorder.

Figure 6:
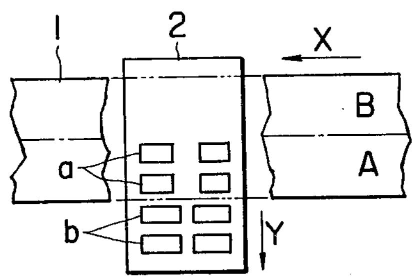
FIGS. 6 and 7 are diagrammatic representation of the recording mode and the playback mode of the magnetic head illustrated in FIG. 3, respectively.
Figure 7:
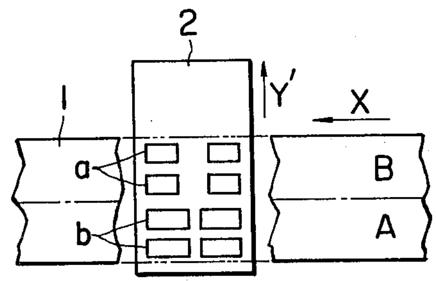

Next, description will be made on the present invention for use in a cassette tape recorder, by referring to FIGS. 6 and 7. Arrow X represents the direction of travel of the magnetic tape, and Arrow Y and Y' represent the directions of vertical movements of the magnetic head.

Description will first be made on the instance of recording. As shown in FIG. 6, the magnetic head 2 as a whole is moved downwardly in the direction of the arrow Y by the position shifting means so as to bring the wide-gapped recording cores a and a into contact with the side A of the magnetic tape 1. By depressing the recording button, the coils (not shown) which are wound around recording cores a and a is applied with a bias current and also with the information signal which is to be recorded. As a result, the information signal is recorded on the side A of the tape 1 as the latter is caused to run.

In case it is intended to playback the information recorded on the track A of the tape, the playback button is depressed after re-winding. Whereupon, as shown in FIG. 7, the magnetic head 2 is caused to move upwardly in the direction of the arrow Y' by the position shifting means so as to bring the narrow-gapped playback cores b and b to abut the signal-carrying side A of the tape 1. The recorded information signal is derived from the coils (not shown) which are wound around the playback cores b and b as the tape is running.

As stated above, the most optimum cores in the single magnetic head can be used for each of the recording and playback modes by a simple vertical movement of the magnetic head.

Figure 8:
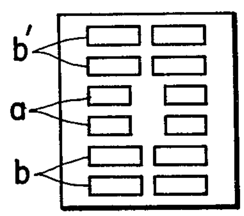
FIGS. 8 and 9 are diagrammatic explanatory front views of magnetic head arrangements for cassette tape recorder embodying the present invention, capable of easily making reversible recording and playback operations.
Figure 9:
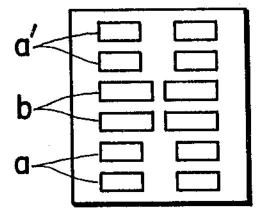

Description will hereunder be made with respect to modified examples of the present invention by referring to FIGS. 8 and 9.

These examples relate to magnetic heads for use in a 4 track—2 channel cassette tape recorder designed for easily carrying out reversible recording and playback operations.

In FIG. 8, in addition to the arrangement of the core units shown in FIG. 3, there is additionally provided another unit of cores b' and b' having the same characteristic which is also the same with that of cores b and b and being intended for playback, being positioned above the other two units a and b by utilizing the blank portion of the magnetic head of FIG. 3. The distance between two adjacent cores a and b' of adjacent units is identical with that between the core a of the first unit and the core b of the second unit.

In this example, the core units a and a are used for the recording of both of the two tracks of the magnetic tape, i.e., both forward run and reverse run. The core units b and b are used exclusively for the playback in one direction. The core units b' and b' are used exclusively for the playback in the direction opposite to said one direction. Therefore, it is possible to carry out reversible runs of the magnetic tape by selectively shifting the position of the magnetic head vertically by a minimum distance.

FIG. 9 shows another arrangement of this example. The core units are arranged so that a reverse playback core unit is flanked by a one-way recording core unit a and an opposite-way recording core unit a'.

In each of the arrangements of FIG. 8 and FIG. 9, the additional core unit, which may be for playback or recording, has the same characteristic with the cores of the other units of the same operation mode.

Figure 10:
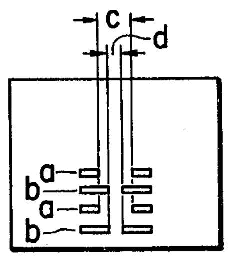
FIG. 10 is a diagrammatic explanatory representation of front side of the magnetic head for another recording track arrangement usually adopted in open-reel type tape recorder, embodying the present invention.

FIG. 10 shows, in a diagrammatic representation, a basic arrangement of the core units in a single magnetic head intended for another 4 track—2 channel track arrangement usually seen in open-reel tape recorder. Parts similar to those in FIG. 3 are indicated by like reference symbols and numerals. In this example, the respective recording cores a and a and playback cores b and b are arranged in a manner different from the arrangement shown in FIG. 3. Of course, these cores a and a have a same characteristic, and the cores b and b have a same characteristic independently of that of the cores a and a. That is, the respective recording cores a and a and the respective playback cores b and b are arranged in alternate fashion so as to be in the order of a, b, a, b. Moreover, the distance between the cores a and a is identical with the distance between the cores b and b, and the cores a and a and cores b and b are arranged to exactly face the four tracks of the open-reel type magnetic tape, respectively. Accordingly, by vertically moving the magnetic head by the position shifting means, it is possible to bring the respective unit cores to contact the required tracks, in the same manner as described with respect to the magnetic head of FIG. 3.

Figure 11:
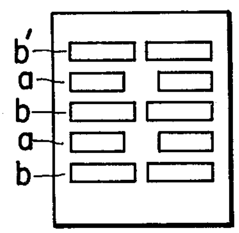
FIGS. 11 and 12 are diagrammatic explanatory front views of magnetic head for open-reel tape recorder arrangements embodying the present invention, capable of easily making reversible recording and playback operations.
Figure 12:
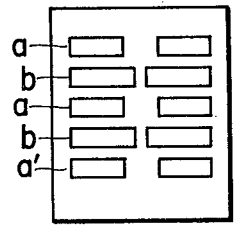

FIGS. 11 and 12 show a couple of examples of the magnetic head intended for use in a 4 track—2 channel open-reel tape recorder which is designed for easily carrying out two-way (reversible) recording and playback operations.

In the example shown in FIG. 11, it will be seen that, in addition to the arrangement of the core units shown in FIG. 10, there is provided a further core unit b' which is intended for the playback operation. In the example shown in FIG. 12, there is additionally provided a further core unit a' which is intended for the recording operation.

The operation of the magnetic core in these examples is exactly the same as that discussed in connection with FIG. 10, and reversible recording is carried out.

Description has been made with respect to FIGS. 10, 11 and 12 which are examples designed for 4 track—2 channel open-reel tape recorders. It should be understood, however, the present invention is not limited thereto, and the magnetic head assembly of this invention is applicable to the so-called full-track type, 2 track—2 channel type and other multi-track type tape recorders, with the same efficiency.

As has been stated above, according to the present invention, even the magnetic head assembly of the so-called two-head type simple structure is able to have the electric characteristic superiorities of a three-head type structure, such as good recording and playback frequency characteristic, low distortion, enlarged dynamic range and improved S/N ratio, without the need of complicated means as compared with the known two-head type tape recorders. Also, the magnetic head assembly of the present invention is able to concurrently have both the recording and the playback functions by a single head. Therefore, this magnetic head provides a remarkable effect when used especially in a cassette tape recorder which has severe limitations in the arrangement of magnetic heads. Furthermore, because the cores are arranged in vertically stacked relationship, the contact of the cores with the magnetic tape is much more stable as compared with the known combination magnetic head wherein the cores are arranged horizontally. This is due to the fact that the vertically arranged cores in the magnetic head of the present invention have, so to speak, the same small contacting area as a magnetic head designed exclusively for a single function of recording or playback, when compared with the horizontally arranged cores having much broader contacting area in which instance there is produced a greater contact resistance and accordingly the touch of the tape onto the surface of the magnetic head becomes unstable.

In addition, the inconvenience and difficulty which have been encountered in the known three-head structure with respect to insuring good azimath alignment are obviated by the magnetic head of the present invention because of the fact that the contact surface is singular so far as the recording and playback head is concerned. Therefore, the adjustment of azimath alignment need to be made only for a single magnetic head. Thus, the adjustment operation is simplified.

What is claimed is:

1. A magnetic head assembly for use in cooperation with a movable recording medium, comprising:

a casing;

a first core unit housed in said casing and having a core of a certain gap width for recording operation;

a second core unit housed in said casing and having at least one core of a gap width for playback operation which is narrower than the core gap width of said first core unit, said first and second gap widths being measured in the direction that the recording medium moves with respect to the casing, said first and second core units being stacked with respect to each other with the core gaps of the respective core units substantially in alignment along a single line extending lengthwise of the gaps in a direction transversely to the direction that the recording medium moves with respect to the casing.

2. A magnetic head assembly according to claim 1, in which:

said first core unit for recording operation comprises two cores having the same characteristic each other and said second core unit for playback operation comprises two cores having the same characteristic each other.

3. A magnetic head assembly according to claim 2, in which:

the respective cores are arranged so that the recording core and the playback core are alternately disposed in adjacent relationship.

4. A magnetic head assembly according to claim 1, further comprising:

a third core unit housed in said casing and having at least one core of a core gap aligned with the core gaps of the other cores, said third core unit being spaced from said other core units the same distance as that between the other core units.

5. A magnetic head assembly according to claim 4, in which:

said third core unit is arranged for recording operation and has a characteristic the same as that of the first recording core unit.

6. A magnetic head assembly according to claim 4, in which:

said third core unit is arranged for playback operation and has a characteristic the same as that of the second playback core unit.

7. A magnetic head assembly according to claim 5, in which:

the first, second and third core units are arranged in that order.

8. A magnetic head assembly according to claim 7, in which:

each of said first, second and third core units is comprised of two spaced cores forming a pair, the two cores of each pair having the same characteristic.

9. A magnetic head assembly according to claim 6, in which:

the first, second and third core units are arranged in the order of the second, first and third core units.

10. A magnetic head assembly according to claim 9, in which:

each of said second, first and third core units is comprised of two cores forming a pair, the two cores of each pair having the same characteristic.

11. A magnetic head assembly according to claim 3, further comprising:

a third recording core unit having a core whose core gap is aligned with the core gaps of the other cores, said third recording unit having a characteristic the same as that of the respective cores of the first core unit, the respective cores being arranged alternately as recording and playback cores.

12. A magnetic head assembly according to claim 3, further comprising:

a third playback core unit having a core whose core gap is aligned with the core gaps of the other cores, said third playback core unit having a characteristic the same as that of the respective cores of the second core unit, the respective cores being arranged alternately as recording and playback cores.

* * * * *